(12) United States Patent
Huang

(10) Patent No.: US 9,720,254 B1
(45) Date of Patent: Aug. 1, 2017

(54) EYEGLASS STRUCTURE WITH REAR-VIEW MIRROR

(71) Applicant: Wen-Tse Huang, Kaohsiung (TW)

(72) Inventor: Wen-Tse Huang, Kaohsiung (TW)

( * ) Notice: Subject to any disclaimer, the term of this patent is extended or adjusted under 35 U.S.C. 154(b) by 0 days.

(21) Appl. No.: 15/138,241

(22) Filed: Apr. 26, 2016

(51) Int. Cl.
*G02C 9/02* (2006.01)
*G02C 7/14* (2006.01)
*B62J 29/00* (2006.01)
*G02C 5/14* (2006.01)
*G02C 5/22* (2006.01)

(52) U.S. Cl.
CPC ............... *G02C 9/02* (2013.01); *B62J 29/00* (2013.01); *G02C 5/146* (2013.01); *G02C 5/22* (2013.01); *G02C 7/14* (2013.01)

(58) Field of Classification Search
CPC .................................. G02C 9/02; G02C 11/00
USPC ................... D16/309, 330, 336; 351/50, 158
See application file for complete search history.

(56) References Cited

U.S. PATENT DOCUMENTS

| | | | | |
|---|---|---|---|---|
| 5,048,943 A * | 9/1991 | Allen | ....................... | G02C 9/02 351/50 |
| 5,764,335 A * | 6/1998 | Berke | .................... | A42B 1/247 351/41 |
| 6,065,832 A * | 5/2000 | Fuziak | ..................... | G02C 9/02 351/50 |
| 2008/0158506 A1* | 7/2008 | Fuziak | ............... | G02B 27/0172 351/158 |

* cited by examiner

*Primary Examiner* — Darryl J Collins
(74) *Attorney, Agent, or Firm* — Alan D. Kamrath; Kamrath IP Lawfirm, P.A.

(57) ABSTRACT

An eyeglass structure includes a glasses frame, a temple, and a rear-view mirror unit. The temple has a front end connected to a side edge of the glasses frame. The rear-view mirror unit includes a rear-view mirror and a holder. A first end of the holder is pivotally integrated with the temple or glasses frame for a rotational movement of the holder relative to the temple or the glasses frame. The rear-view mirror is pivotally fitted at a second end of the holder for a rotational movement of the rear-view mirror relative to the holder. A cyclist wearing a pair of eyeglasses with the eyeglass structure can watch traffic conditions at the back through the rear-view mirror for vigilant purposes such as avoiding collision risks proactively.

2 Claims, 6 Drawing Sheets

EYEGLASS STRUCTURE WITH REAR-VIEW MIRROR

BACKGROUND OF THE INVENTION

1. Field of the Invention

The present invention relates to a pair of eyeglasses and, more particularly, to an eyeglass structure with a rear-view mirror at a side edge of the pair of eyeglasses.

2. Description of the Related Art

A bicycle is a travel tool of an office worker and a good partner of a cyclist in his/her leisure life. A cyclist who rides a bicycle, albeit small and easily controlled, in fickle traffic conditions on a road might confront lots of risks and has to ride carefully for personal safety. In this regard, a cyclist should obey traffic rules and pay more attentions to personal safety and protection. For a cyclist's personal safety, some warning devices such as bicycle bell, bicycle light and reflector to remind vehicle drivers of a bicycle can be installed on a bicycle in general. Despite the warning devices such as bicycle light and reflector for the basic warning function, some careless vehicle drivers still pay scant attentions to and even accidentally collide with bicycles ahead. Thus, a cyclist should observe traffic conditions at the back early and react to them by decreasing the bicycle's speed or pulling over for personal safety and protection.

BRIEF SUMMARY OF THE INVENTION

Thus, an objective of the present invention is to provide an eyeglass structure with a rear-view mirror through which a cyclist wearing the pair of eyeglasses can observe traffic conditions at the back for better driving safety in cycling.

To achieve this and other objectives, an eyeglass structure with a rear-view mirror of the present invention includes a glasses frame having two side edges, a temple, and a rear-view mirror unit. The temple includes a front end connected to a corresponding side edge of the glasses frame. The rear-view mirror unit includes a holder and a rear-view mirror. The holder includes a first end and a second end spaced from the first end in a horizontal direction. The first end of the holder is pivotally integrated with the temple or the glasses frame. The rear-view mirror is pivotally fitted at the second end of the holder, so that the rear-view mirror is held in the holder or stopped at a position at which both the rear-view mirror and the holder form an angle.

The eyeglass structure of the present disclosure can help a cyclist to watch traffic conditions at the back for vigilant and practical purposes such as avoiding incidents proactively.

In a preferred form, a holding space is formed in an outer side of the front end of the temple. Two spaced locating slots are provided in the corresponding side edge of the glasses frame, and the holder further includes two horizontal segments between the first and second ends of the holder. The holder is integrated with the temple by a pivot extending through the temple and the first end of the holder, so that the holder is rotatable relative to the temple between a folded position and an unfolded position about an axis defined by the pivot. The holder is held in the holding space when the holder is in the folded position, and the holder is adjacent to the glasses frame and the horizontal segments of the holder are received and positioned in the locating slots of the glasses frame respectively when the holder is in the unfolded position.

In another preferred form, the glasses frame further includes a joint portion extending inward from the corresponding side edge, and the front end of the temple is pivotally connected to the joint portion. A holding space is formed in an outer side of the joint portion of the glasses frame. Two spaced locating slots are provided in the side edge, and the holder further includes two horizontal segments between the first and second ends of the holder. The holder is integrated with the glasses frame by a pivot extending through the glasses frame and the first end of the holder, so that the holder is rotatable relative to the glasses frame between a folded position and an unfolded position about an axis defined by the pivot. The holder is held in the holding space when the holder is in the folded position, and the holder is adjacent to the glasses frame and the horizontal segments of the holder are received and positioned in the locating slots of the glasses frame respectively when the holder is in the unfolded position.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
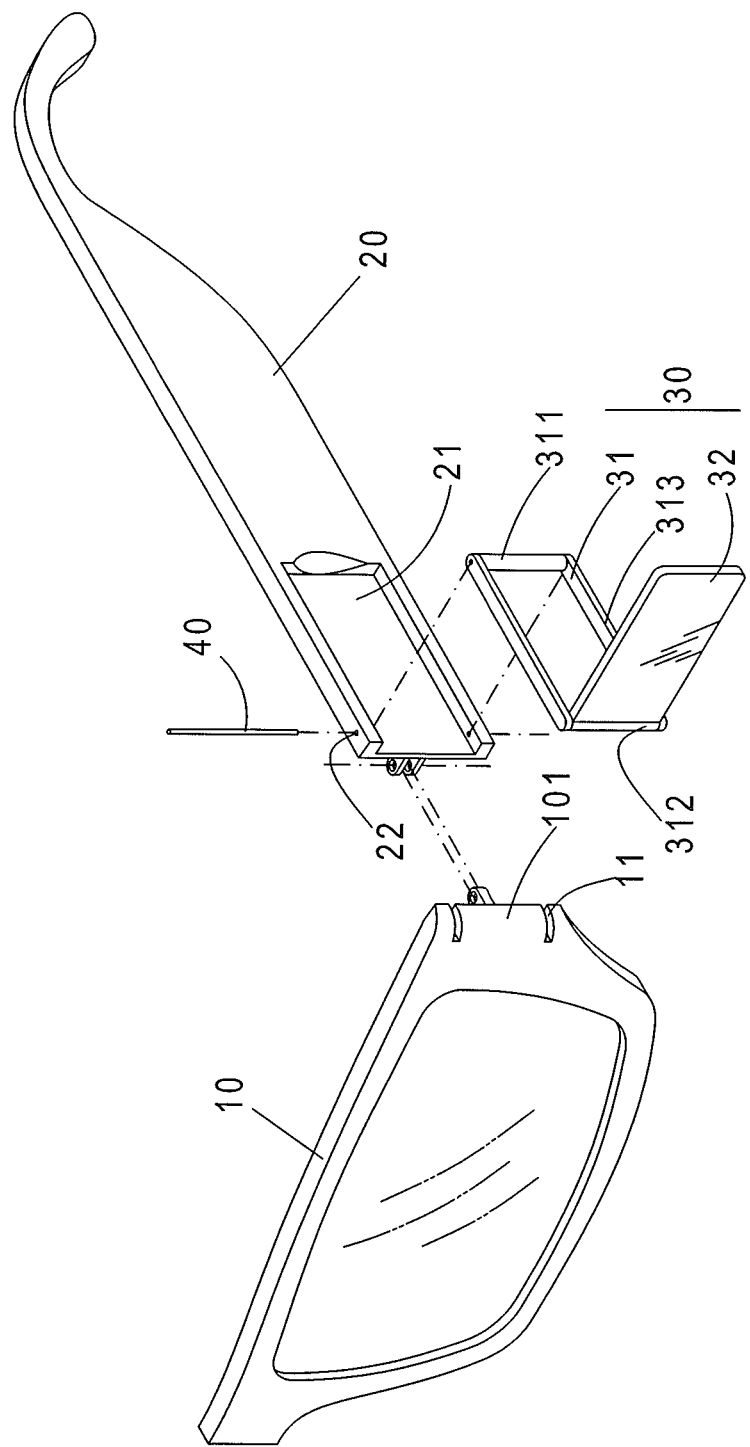
FIG. 1 is an exploded view of an eyeglass structure in accordance with a first embodiment of the present invention.

An eyeglass structure according to a first embodiment of the present invention is shown in FIGS. 1 through 4 of the drawings and generally includes a glasses frame 10, a temple 20, and a rear-view mirror unit 30. The glasses frame 10 has two side edges 101 (only one side edge 101 shown in FIGS. 1 through 6), each of which includes at least one locating slot 11. In this embodiment, two locating slots 11 spaced from each other are provided in each side edge 101.

The temple 20 includes a front end 201 pivotally connected to a corresponding side edge 101 of the glasses frame 10. A holding space 21 is formed in an outer side of the front end 201 of the temple 20, and two axial holes 22 aligned to each other in a vertical direction are respectively provided in the front end 201 and in communication with the holding space 21.

Figure 2:
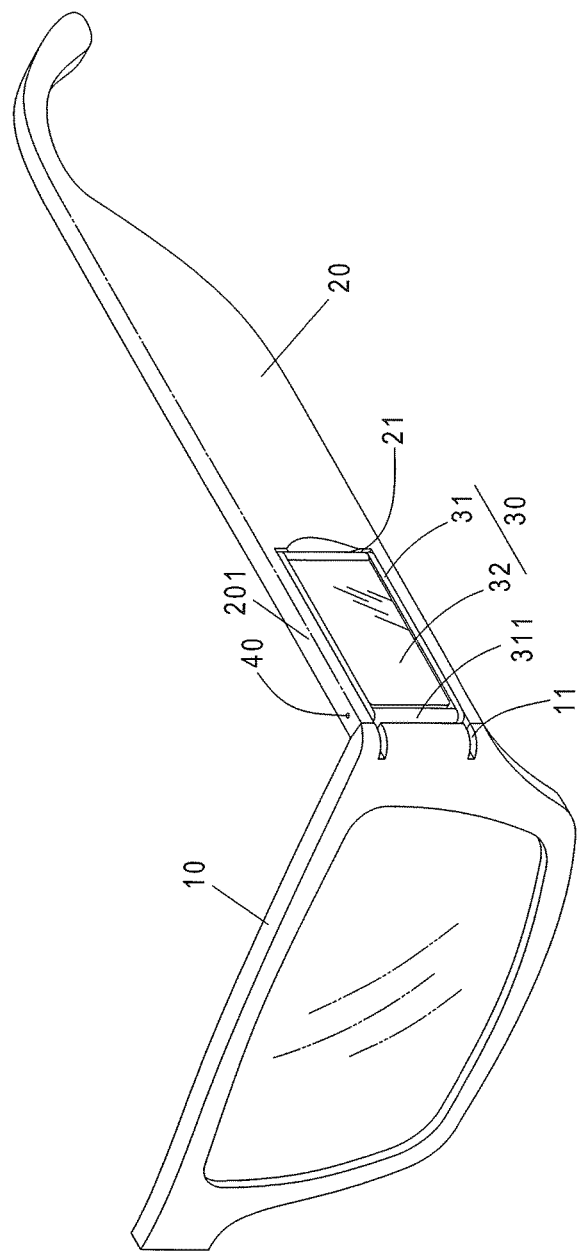
FIG. 2 is a schematic view of the eyeglass structure of FIG. 1 which is assembled, with a rear-view mirror unit held in a temple.
Figure 3:
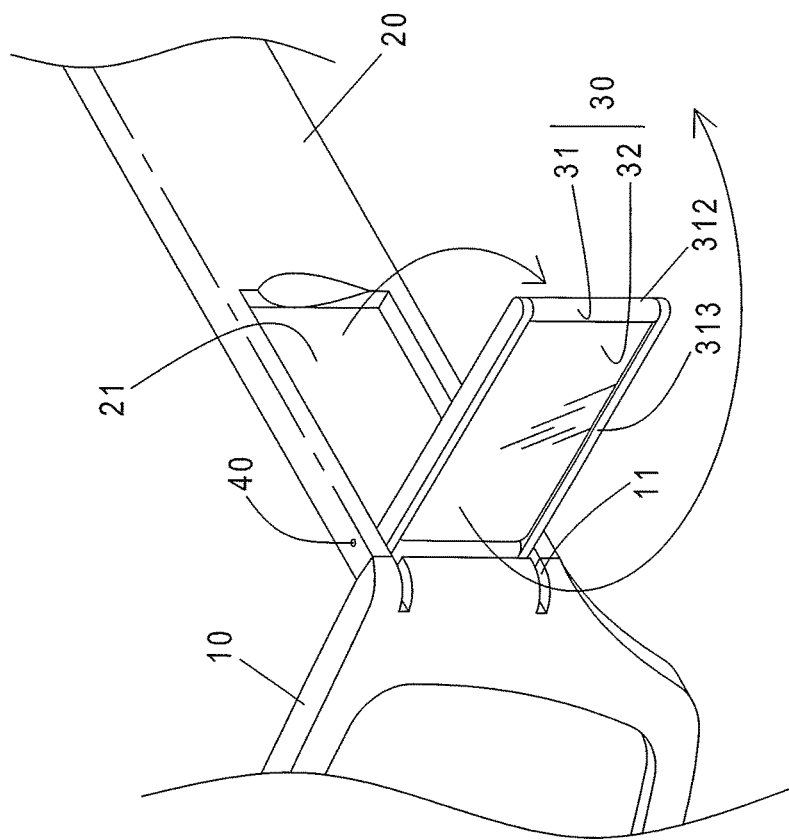
FIG. 3 is a schematic view for the unfolded rear-view mirror unit of the eyeglass structure of FIG. 2.
Figure 4:
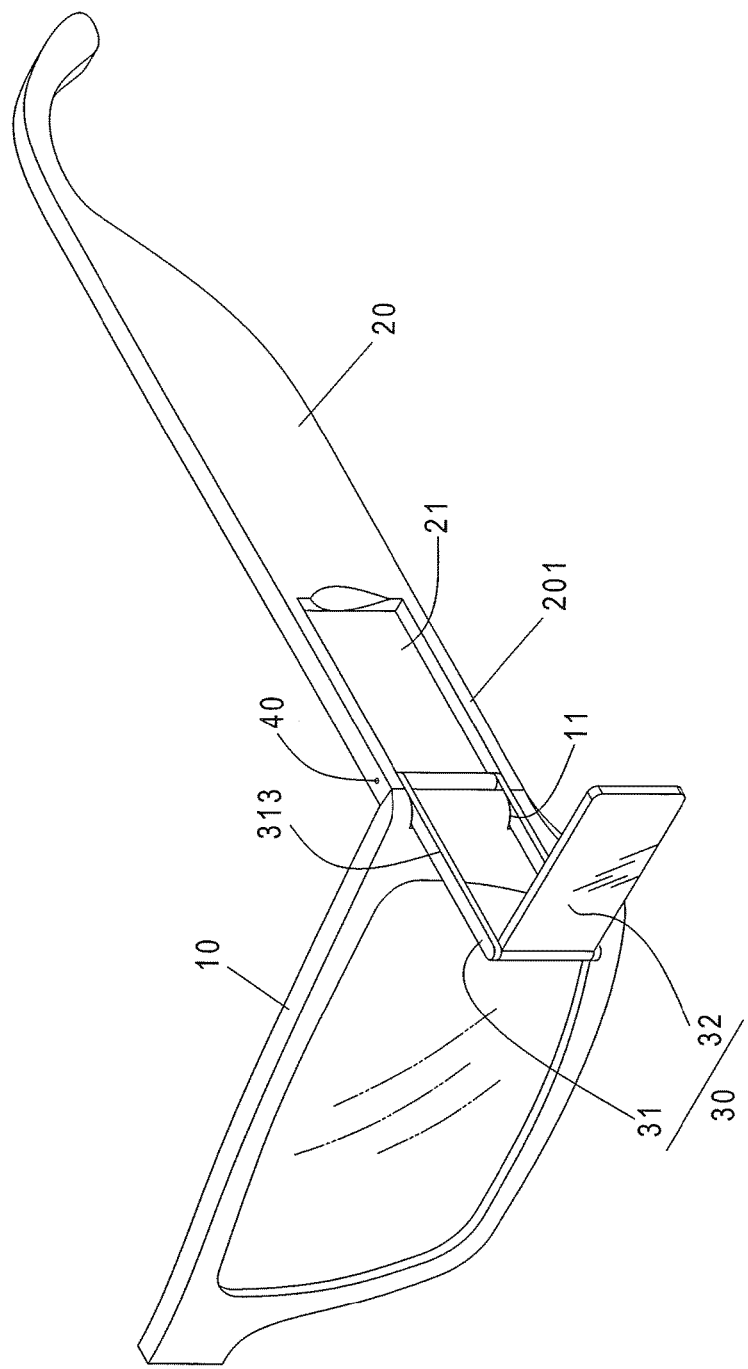
FIG. 4 is a schematic view for the rear-view mirror unit of the eyeglass structure of FIG. 2 in operation.

The rear-view mirror unit 30 includes a holder 31 and a rear-view mirror 32. In this embodiment, the holder 31 is a frame body and includes a first end 311, a second end 312 spaced from the first end 311 in a horizontal direction perpendicular to the vertical direction, and two horizontal segments 313 connected between the first and second ends 311 and 312. The holder 31 is integrated with the temple 20 when the axial holes 22 of the temple 20 and the first end 311 of the holder 31 are penetrated by a pivot 40, so that The holder 31 is rotatable relative to the temple 20 between a folded position and an unfolded position about an axis defined by the pivot 40. In the folded position, the holder 31 is held in the holding space 21 (FIG. 2). In the unfolded position, the holder 31 is adjacent to the glasses frame 10, and the horizontal segments 313 of the holder 31 are received and positioned in the locating slots 11 of the glasses frame 10 (FIG. 4). The rear-view mirror 32 is pivotally fitted at the second end 312 of the holder 31, so that the rear-view mirror 32 is rotatable relative to the holder 31 and can be held in the holder 31 (FIG. 3) or stopped at a position at which both the rear-view mirror 32 and the holder 31 form an angle (FIG. 4).

As shown in FIG. 2, the rear-view mirror unit 30 which is not in use can be held in the holding space 21 of the temple 20, so that an overall appearance and functions of the pair of eyeglasses of the present invention are identical to those of a pair of conventional glasses. To enable the rear-view mirror 32, a user rotates the holder 31 of the rear-view mirror unit 30 relative to the temple 20 to extract the holder 31 from the holding space 21 (FIG. 3) and stops the holder 31 at a position at which both the holder 31 and the corresponding temple 20 form a right angle approximately for watching traffic conditions at the back through the rear-view mirror 32. Moreover, the holder 31 in FIG. 3 can be rotated forward and parallel with the temple 20 (180 degrees approximately as shown in FIG. 4) for a next rotational movement of the rear-view mirror 32 relative to the holder 31, which coordinates the rear-view mirror 32 to form an right angle approximately relative to the temple 20, so that a user can watch traffic conditions at the back through the rear-view mirror 32. In this embodiment as shown in FIG. 4, any negative effect attributed to shakes of a moving bicycle or vehicle is reduced, and traffic conditions at the back are available to a glasses user because the horizontal segments 313 of the holder 31 are held and positioned in the locating slots 11 of the glasses frame 10.

Figure 5:
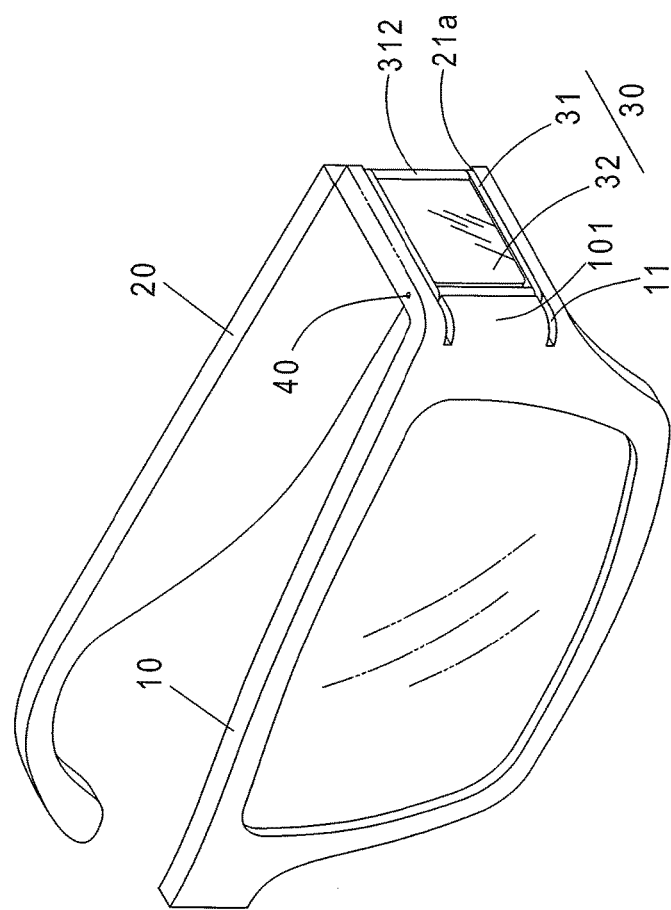
FIG. 5 is a perspective schematic view of an eyeglass structure in accordance with a second embodiment of the present invention, with a rear-view mirror unit held in a glasses frame.
Figure 6:
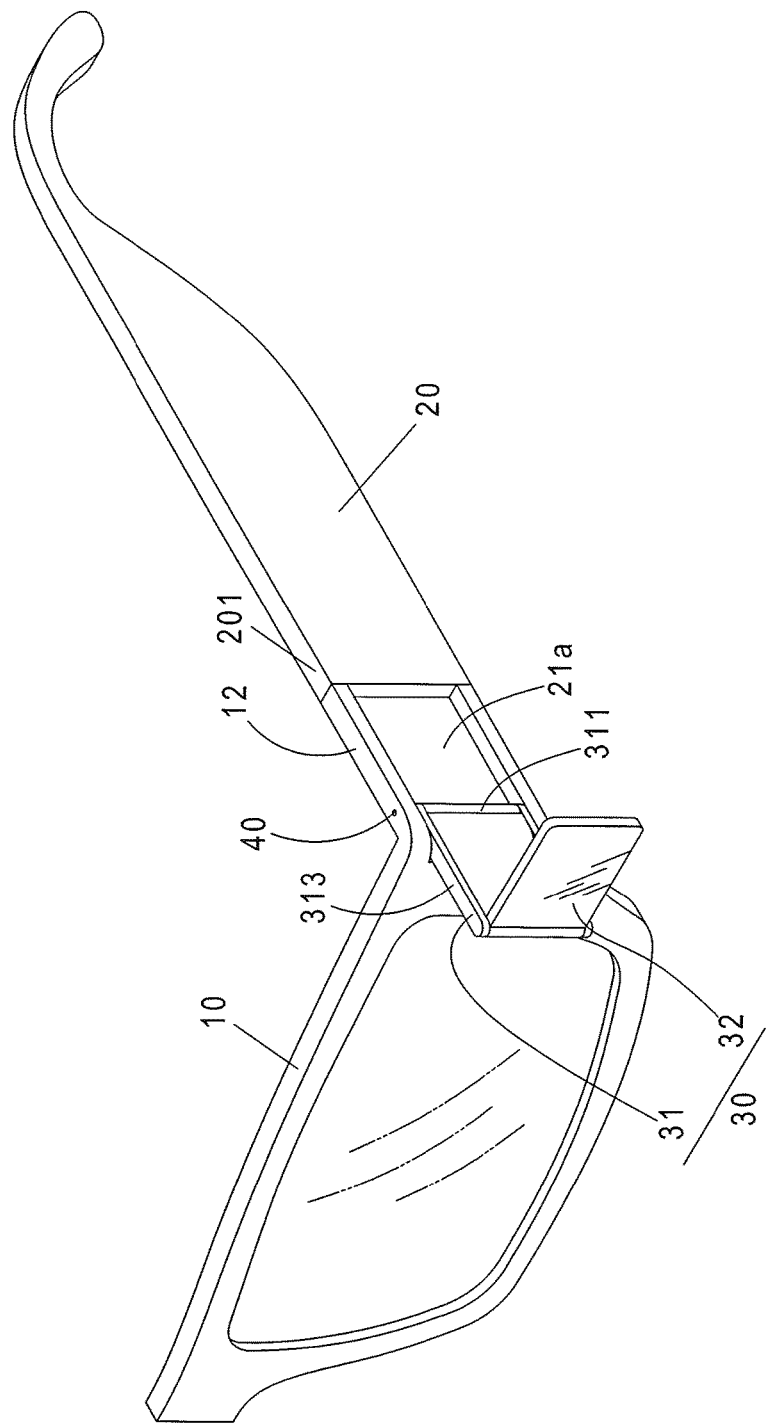
FIG. 6 is a schematic view for the rear-view mirror unit of the eyeglass structure of FIG. 5 in operation.

An eyeglass structure according to a second embodiment of the present invention is shown in FIGS. 5 and 6 and includes a glasses frame 10, a temple 20, and a rear-view mirror unit 30. In this embodiment, the rear-view mirror unit 30 is mounted on the glasses frame 10 compared with the rear-view mirror unit 30 in the first embodiment. Specifically, the glasses frame 10 further includes a joint portion 12 extending inward from each side edge 101, and the front end 201 of the temple 20 is pivotally connected to the joint portion 12. A holding space 21a is formed in an outer side of the joint portion 12 of the glasses frame 10, and the holder 31 is integrated with the glasses frame 10 when a front end of the joint portion 12 and the first end 311 of the holder 31 are penetrated by a pivot 40, so that the holder 31 is rotatable relative to the glasses frame 10 between a folded position and an unfolded position about an axis defined by the pivot 40. In the folded position, the holder 31 is held in the holding space 21a (FIG. 5). In the unfolded position, the holder 31 is adjacent to the glasses frame 10, and the horizontal segments 313 of the holder 31 are received and positioned in the locating slots 11 of the glasses frame 10 (FIG. 6). Thus, a user can watch traffic conditions at the back through the rear-view mirror 32.

The eyeglass structure of the present invention is designed for a cyclist to watch traffic conditions at the back. A cyclist riding a bicycle in the daytime is able to watch a vehicle approaching from behind through the rear-view mirror 32 for a vigilant purpose. Furthermore, a cyclist riding a bicycle at night is able to detect a vehicle's light beam at the back through the rear-view mirror 32 and react to a traffic condition by decreasing the bicycle's speed or pulling over for personal safety and protection.

The scope of the invention is to be indicated by the appended claims, rather than by the foregoing description, and all changes which come within the meaning and range of equivalency of the claims are intended to be embraced therein.

The invention claimed is:

1. An eyeglass structure comprising:
a glasses frame having two side edges;
a temple including a front end connected to a corresponding side edge of the glasses frame; and
a rear-view mirror unit including a holder and a rear-view mirror, with the holder including a first end and a second end spaced from the first end in a horizontal direction, with the first end of the holder pivotally integrated with the temple, with the rear-view mirror pivotally fitted at the second end of the holder, wherein the rear-view mirror is held in the holder or stopped at a position at which both the rear-view mirror and the holder form an angle, wherein a holding space is formed in an outer side of the front end of the temple, with two spaced locating slots provided in the corresponding side edge, with the holder further including two horizontal segments between the first and second ends of the holder, with the holder integrated with the temple by a pivot extending through the temple and the first end of the holder, with the holder being rotatable relative to the temple between a folded position and an unfolded position about an axis defined by the pivot, wherein the holder is held in the holding space when the holder is in the folded position, wherein the holder is adjacent to the glasses frame and the two horizontal segments of the holder are received and positioned in the two locating slots of the glasses frame respectively when the holder is in the unfolded position.

2. An eyeglass structure comprising:
a glasses frame having two side edges;
a temple including a front end connected to a corresponding side edge of the glasses frame; and
a rear-view mirror unit including a holder and a rear-view mirror, with the holder including a first end and a second end spaced from the first end in a horizontal direction, with the first end of the holder pivotally integrated with the glasses frame, with the rear-view mirror pivotally fitted at the second end of the holder, wherein the rear-view mirror is held in the holder or stopped at a position at which both the rear-view mirror and the holder form an angle, wherein the glasses frame further includes a joint portion extending inward from the corresponding side edge, with the front end of the temple pivotally connected to the joint portion, with a holding space formed in an outer side of the joint portion of the glasses frame, with two spaced locating slots provided in the corresponding side edge, with the holder further including two horizontal segments between the first and second ends of the holder, with the holder integrated with the glasses frame by a pivot extending through the glasses frame and the first end of the holder, with the holder being rotatable relative to the glasses frame between a folded position and an unfolded position about an axis defined by the pivot, wherein the holder is held in the holding space when the holder is in the folded position, wherein the holder is adjacent to the glasses frame and the two horizontal segments of the holder are received and positioned in the two locating slots of the glasses frame respectively when the holder is in the unfolded position.

\* \* \* \* \*